Aug. 31, 1943.   G. INNES   2,328,278
GRAIN HANDLING MECHANISM
Filed Jan. 21, 1941   3 Sheets-Sheet 1
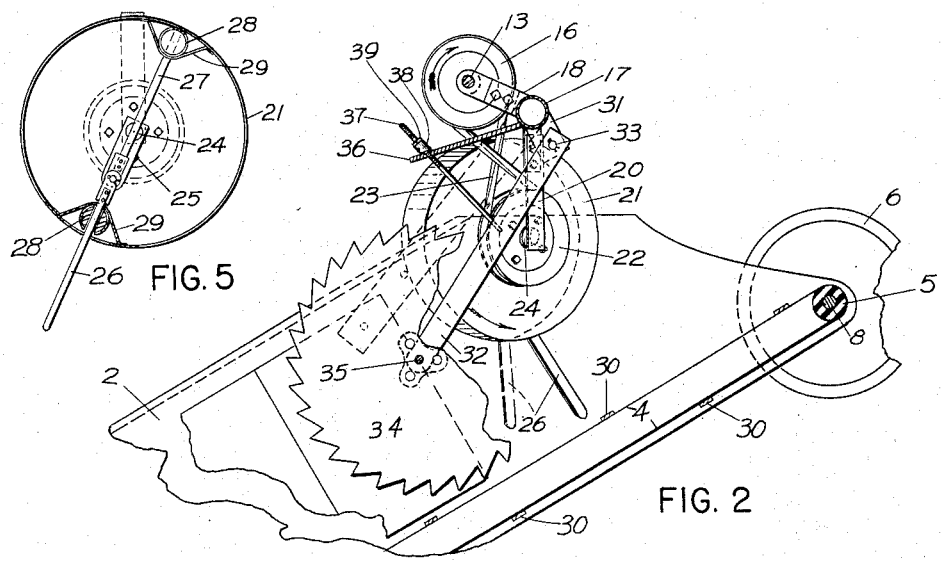
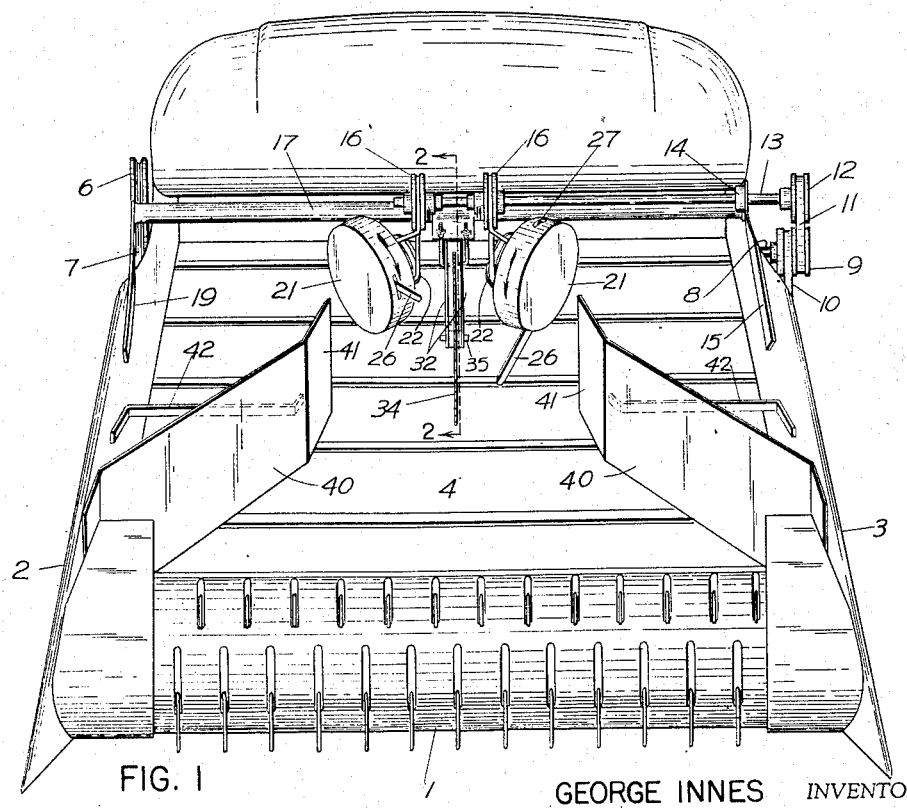
GEORGE INNES INVENTOR.
BY Merrill M. Blackburn
ATTORNEY.

Aug. 31, 1943.   G. INNES   2,328,278
GRAIN HANDLING MECHANISM
Filed Jan. 21, 1941   3 Sheets-Sheet 2

INVENTOR.
GEORGE INNES
BY Merrill M. Blackburn
ATTORNEY.

Aug. 31, 1943.  G. INNES  2,328,278
GRAIN HANDLING MECHANISM
Filed Jan. 21, 1941  3 Sheets-Sheet 3

GEORGE INNES INVENTOR.
BY Merrill M. Blackburn
ATTORNEY.

Patented Aug. 31, 1943

2,328,278

UNITED STATES PATENT OFFICE 2,328,278

GRAIN HANDLING MECHANISM

George Innes, Davenport, Iowa

Application January 21, 1941, Serial No. 375,317

14 Claims. (Cl. 56—364)

The present invention pertains to grain handling mechanism and more particularly to mechanism for picking up cut grain from the ground and delivering it to a threshing mechanism.

The regular threshing machine that has been used for threshing grain for nearly a century receives the grain in concentrated form, because it was first bound into sheaves, then shocked, then stacked or taken from the shock and put into the threshing machines in bundles of considerable size. Since threshing could not be done effectively unless these bundles were loosened and spread as they went into the cylinder of the machine, it became common practice fifty years ago to spread and loosen the bundles or sheaves by hand. Then there followed what was known as the threshing machine feeder which cut the bands and automatically loosened and spread the grain so that the straw went into the cylinder in a form more easily threshed. It thus becomes a recognized principle that grain which is concentrated and matted must be loosened up and spread over the face of the cylinder so that the work of threshing can be done effectively and economically.

The first combines used, about fifty years ago, comprised a machine quite like the threshing machine which had been used for many years before and a header such as had been used on binders. This header was set at a right angle to the threshing machine and comprised a sickle, a reel, a conveyor, etc. The grain cut by the sickle was carried by the conveyor from behind the sickle and put into the threshing unit in a manner similar to that in which the sheaves were put into the threshing unit, except that this grain was not concentrated and matted by having lain for a long time in a windrow or having been bound into a sheaf.

Within the last decade, many combine harvester threshers have been made with cylinders of substantially the same length as the sickle and terminating in substantially the same plane as the ends of the sickle. They were found to have a decided advantage over the older design in which the grain was collected at one end of the conveyor and thus concentrated at one particular part of the cylinder. The spreading out resulted from the fact that the grain, when cut, fell upon a conveyor in a thin, unconcentrated form in which it grew, and it was taken by this conveyor upward and backward and delivered to the cylinder in a spread-out condition, resulting in highly effective threshing and reduced power consumption. Because the grain and straw passing through the threshing mechanism was spread out in a thin layer in the machine, it was easy to separate the kernels from the straw, and the separation was very thorough.

Since, in certain sections of the country, grain ripens unevenly or weeds grow with the grain and remain green when the grain must be harvested, the harvesting process is disturbed and the threshed grain is subjected to excessive moisture coming from the weeds or from the green kernels of unripe grain. This results in much spoilage. It has therefore become a general practice to cut the grain prior to the time it should be threshed and lay it in a windrow on the stubble to cure.

The sickles and cylinders of harvester threshers in which the sickles and cylinders are the same length vary in length from four to six feet. The major portion of the straw of the windrows lies in a strip about eighteen inches wide, whereas the cylinder may be fifty inches or more in length. Therefore, the grain goes into this type of harvester thresher in a concentrated form for which this particular type of machine was not designed. This concentration of grain results in a greater amount of power being necessary to drive the threshing mechanism. Also, this concentration of grain places a greater strain upon the machine. It is therefore desirable to spread the windrow out to substantially the full length of the cylinder so that the resistance to the operation of the machine will be reduced to a minimum.

It has always been a difficult matter, in any type of threshing machine, to thoroughly thresh flax. The stalks of flax entwine considerably as they grow and the bolls are hard to crush to release the kernels. Therefore, when flax goes into any type of threshing unit in a concentrated form, it is either impossible to thresh it thoroughly or else it must be done by adding power and equipment considerably in excess of that which is used for threshing other grain. When flax is cut and threshed simultaneously by the conterminous sickle and cylinder type of combine, the stalks with their bolls and kernels move backward and upward toward the cylinder in a thin layer, and the threshing and separating is quite effective. However, when the flax has to be laid in windrows for the reasons mentioned above and, as a result, has become more entwined and matted, the conterminous sickle and cylinder type of combine has proven to be a very unsatisfactory threshing mechanism for that purpose.

The purpose, therefore, of this invention is to provide a machine for the purpose stated which will gather grain from a windrow and so distribute it, by the time it reaches a threshing cylinder, that it will be fed to substantially the entire length of the cylinder and will be thoroughly loosened up so that the threshing operation will be as complete and perfect as possible and the power consumption will be reduced to a minimum. It has been my intention to provide a machine which will handle windrows, loosening them up and spreading them out, whether the vegetable matter be flax or other grain, after which the grain will be fed to the threshing cylinder in a de-concentrated form and spread out thoroughly to engage substantially the entire exposed surface of the cylinder of the threshing machine and be fed in a substantially uniform thickness to the cylinder.

In the drawings annexed hereto and forming a part hereof,

Fig. 1 represents a front elevation of one embodiment of this invention;

Fig. 2 represents a fragmentary longitudinal section substantially along the plane indicated by the line 2—2, Fig. 1;

Fig. 5 is a combined end elevation and section of one unit of the grain-actuating mechanism;

Figure 3:
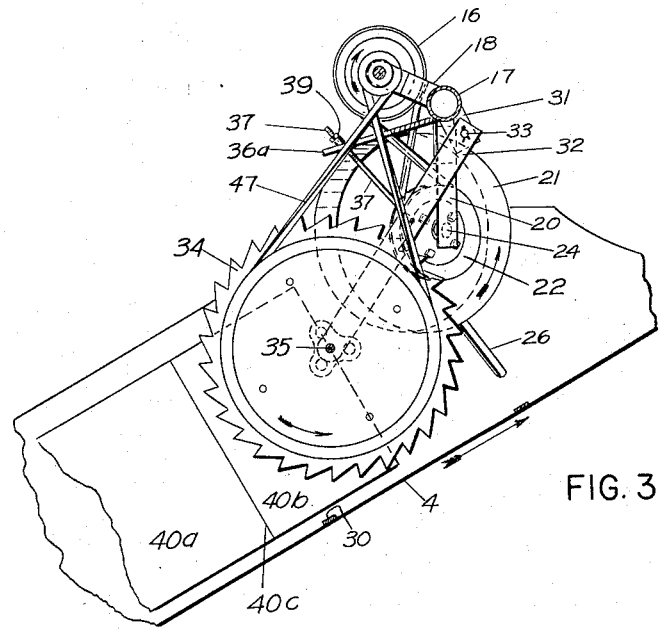
Fig. 3 is a view similar to Fig. 2 but showing a modified form of this construction.
Figure 6:
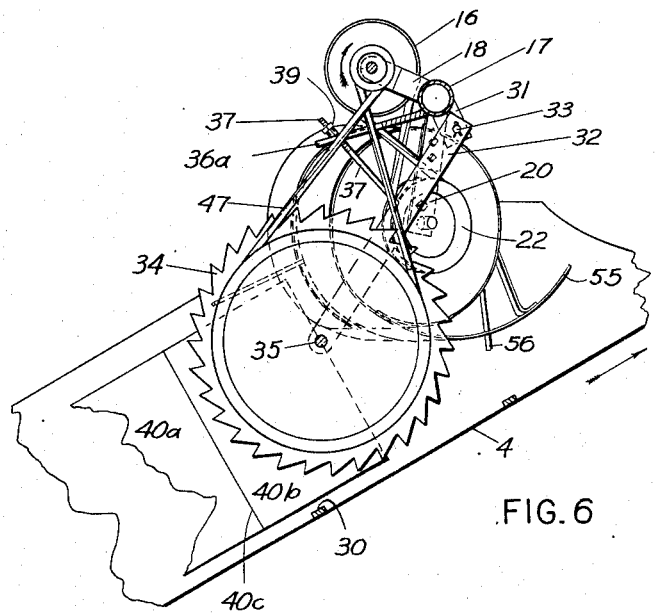
Figures 7, 8, 9:
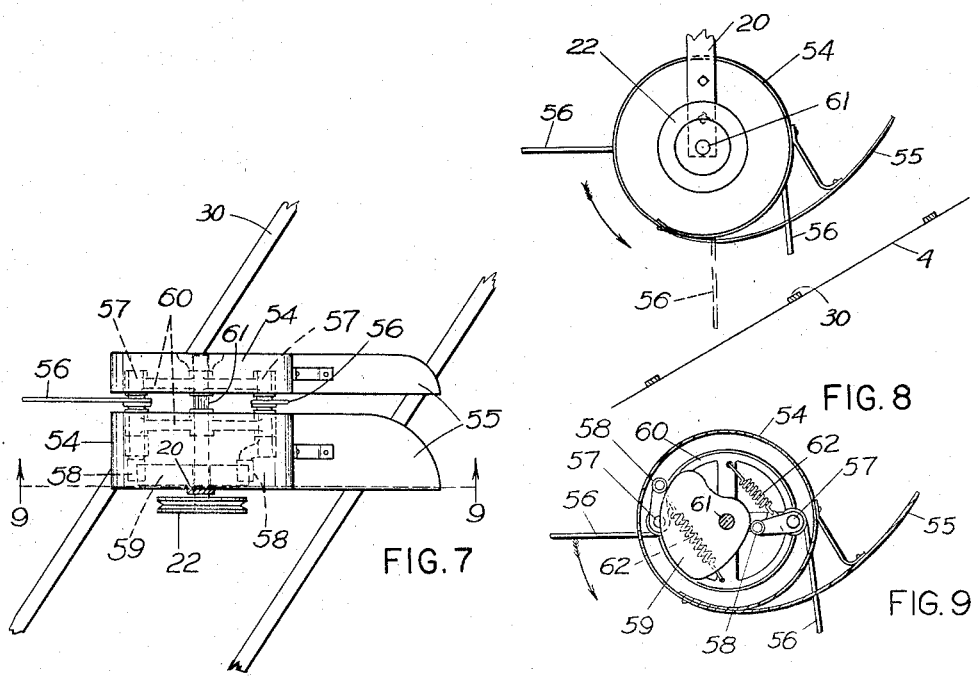

Figs. 6, 7, and 8 show another modification of the structure of Figs. 1 and 2, Fig. 6 being a view similar to Fig. 3, Fig. 7 being a plan, and Fig. 8 a side elevation of this structure; and Fig. 9 represents a section substantially along the plane indicated by the line 9—9, Fig. 7.

Reference will now be made in greater detail to the annexed drawings for a more complete description of this invention. The pick-up 1 is of the general type illustrated in my prior patents, No. 2,133,143 and No. 2,157,261. It is rotatably connected to the side members 2 and 3 in any suitable manner. A conveyor 4 runs over a roller adjacent the pick-up and, at its upper end, over a roller 5. This conveyor may be of the slatted, fabric type, commonly called an apron, or may be of any other suitable construction. I prefer to use the canvas apron illustrated rather than any other type. The roller 5 at the upper end of the conveyor has a belt pulley 6 fixedly connected therewith, and this is driven by a belt 7 from the source of power of the machine. The roller 5 is formed about the shaft 8, and this latter has the pulley 6 thereon, as previously referred to. At its second end, the shaft 8 has a double pulley 9, one side of which receives the belt 10 and the other side the belt 11. A pulley 12 is in coplanar alignment with the pulley 9, and the two are connected in driving relation by the belt 11. The pulley 12 is supported on a shaft 13 mounted in a suitable bracket 14 carried by an arm 15 secured to the side member 3. A pair of spaced pulleys 16 are carried by the inner end of the shaft 13 which is supported by the pipe 17 through the intermediary of arms 18. An arm 19 is secured to the side member 2 and supports one end of the pipe 17. The second end of the pipe 17 is supported by the arm 15 and is therefore rigidly held in place with reference to the side members 2 and 3. The mode of support of the shaft 13 from the pipe 17 is clear from an inspection of Fig. 2.

Arms 20 are secured to and extend downwardly from the pipe 17 and serve as supports for the rotatable drums 21 having drive pulleys 22 connected thereto. The pulleys 16 and 22 are connected by crossed belts 23 which causes the drums 21 to be rotated in opposite directions from the pulleys 16. The axle 24 of each of the drums 21 has a crank 25 at its inner end. The shaft at the outer end of the crank arm is eccentric with relation to the axle 24 and parallel thereto. On this shaft are mounted a pair of fingers 26 and 27 which project through the guide members 28 mounted for oscillation between brackets 29 and the inside of the drum 21. This will be clear from Fig. 5. The axle 24 is held against rotation and each drum 21 is therefore caused to rotate about its individual axle 24. This causes projection and retraction of the fingers 26 and 27 so that the action of these drums is comparable to the action of the pick-up 1 except that the drums rotate in a direction to move the grain backwardly in its course beneath the drums, whereas, in the case of the pick-up, the grain is carried over the pick-up.

Figure 4:
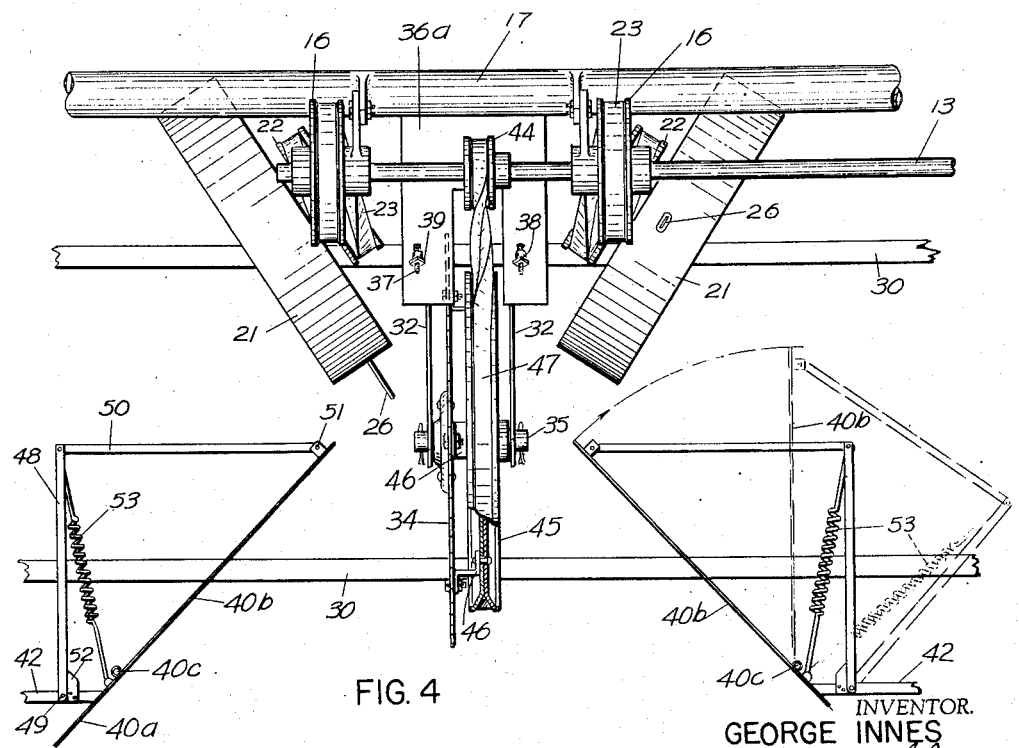
Fig. 4 is a fragmentary view of the structure shown in Fig. 3 looking in a direction perpendicular to the feeding apron.

From Fig. 4 it is apparent that the medial planes of the drums 21 preferably form a dihedral angle of considerable size, which varies with the length of the cylinder, the distance of the grain scatterer from the cylinder, and other variables. The purpose of this is to get the proper distribution of the grain as it is spread out on the apron. It is clear from Figs. 2 and 3 that the fingers 26 and 27, as the drums are rotated, sweep over the apron 4 and are spaced therefrom sufficiently so that they do not strike either the canvas or the cross slats 30. The drums rotate at a sufficient speed to scatter the grain over the apron, sending some of it to the lateral edges thereof. When a drum rotates to a position 90° from that shown in Fig. 5, the finger 26 is withdrawn approximately half way into the drum and, as the rotation continues, the finger is withdrawn farther until it reaches the position of the finger 27 and is withdrawn fully into the drum. This insures complete release of the grain from the drum.

Arms 31 project downwardly and rearwardly from the supporting pipe 17 and have arms 32 connected thereto by pivots 33. A rotary disc 34 having the general appearance of a saw is pivotally connected to the arms 32 by a pivot member 35 and, in the form shown in Figs. 1 and 2, is rotated by the grain passing thereunder and engaging its teeth. A shelf-like member 36 is rigidly connected to the supporting pipe 17 and is connected to the arms 32 by threaded rods 37. A spacer member 38 surrounds each rod 37 and is engaged by a nut 39 adjustable along the rod 37. This nut 39 can be adjusted to vary the limit of downward motion of the saw-like member 34. The connection of the arms 32 to the shelf-like member 36 permits the former to rise and fall with varying quantities of grain passing beneath the disc 34.

As the grain is carried upwardly by the conveyor 4, it engages the disc 34 and causes it to rotate. Also, the teeth of this member are pressed into the grain and have a tendency to prevent the latter from being moved in masses to one side or the other by the drums 21. The tendency is for the member 34 to hold part of the grain in the middle of the conveyor and to permit a part to be moved to the right by one drum and another part to the left by the other drum. This thoroughly tears to pieces the windrow travelling on the conveyor 4 and spreads it out over the width thereof.

The guides 40 are secured to the side members 2 and 3 and extend diagonally inwardly above the conveyor 4 and toward the drums 21. These guides have their upper ends 41 bent into substantial parallelism with the longitudinal axis of the conveyor. The guides are connected to the side members 2 and 3 by braces 42 which prevent large quantities of grain moving upwardly with the conveyor from bending the guides laterally toward the sides of the machine.

With some classes of grain, it has been found desirable to have the saw-like member 34 positively driven so that it will more definitely control the feed of the grain. This is noticeably true in connection with the feeding of flax which has a tendency to be very difficult to separate. In order to furnish the required power to the member 34, a belt pulley 44 is fixedly connected to the power shaft 13, and a second belt pulley 45 to the member 34. A plurality of brackets 46 connect the pulley 45 to the saw-like member 34, while a belt 47 connects the pulleys 44 and 45. Thus, since the drums 21 and the saw-like member 34 are simultaneously driven from the same shaft 13, they are rotated in synchronism, but the drums 21 are rotated at a higher speed than the saw-like member 34. This insures the tearing apart of the grain passing upwardly on the conveyor 4. As shown most clearly in Fig. 4, the shelf 36a is notched for the passage of the belt 47.

As has been indicated above, there is a tendency at times for the grain to move upwardly with the conveyor in masses. Sometimes these bunches are so large as to make it difficult for them to pass between the upper ends of the guides. It has therefore been found desirable to divide the guides into two sections 40a and 40b, hinged at 40c. As shown in Fig. 4, the brace 42 is connected to the section 40a below the hinge so that this section is held rigidly. An arm 48 is pivotally connected at 49 to the arm 42 but has a link 50 connected to its upper end. The second end of this link 50 is pivotally connected at 51 to an ear on the upper end of the section 40b. It is therefore apparent that, when a mass of grain presses against the pivoted section 40b, the upper end of this section may move outwardly, swinging the arm 48 away from its stop 52 which normally limits the amount which the arm, link, and pivoted section swing inwardly under the influence of the spring 53. This arrangement permits the saw-like member 34 to pull the mass of grain through between the guides and deliver it to the drums 21 to be pulled apart by them and spread out upon the apron. At the right side of Fig. 4 is illustrated the action of these parts and, from this, it will be seen that swinging of the section 40b outwardly results in a tension on the spring 53 which tends to restore the parts from the dotted line position to the solid line position.

Another type of grain scatterer is shown in Figs. 6, 7, and 8. This comprises, besides other parts, flat straps of sheet metal bent into circles 54, one end of each of the straps projecting, as shown at 55, above and approximately parallel to the apron. The metal circles 54 have an end of each closed to prevent ingress of grain and to furnish supporting means for shafts. A plurality of fingers 56, preferably from two to four, are mounted on oscillatable shafts 57 and project outwardly between the parts 54. Each of the shafts 57 is provided at one end with a crank on which is mounted a roller 58 normally riding on the edge of the cam 59 and causing oscillation of the shafts 57 which are carried by crossarms 60 or a carrier of some other type.

It is clear from Figs. 6 and 8 that the casing formed by the elements 54 is held stationary above the apron 40 and that the shaft 61 rotates therein causing rotation of the crossarms 60 about the axis of the shaft 61. The rollers, following the edge of the cam 59, cause oscillation of the shafts 57 and, consequently, projection and retraction of the fingers 56, as indicated in Fig. 8. The operation of this construction, so far as scattering the grain is concerned, is similar to the operation of the structure described above in connection with Figs. 1 to 5. A cam 59 is contacted by the rollers 58, held against the cam by springs 62, and this results in the fingers 56 being inclined backwardly whereby to assist in the stripping of the grain from the fingers by the action of the projecting ends 55.

Briefly stated, the operation of the machine is as follows. The machine is propelled through a field with a windrow approximately midway of the length of the pick-up. This pick-up is rotated so that its front side lifts the grain and carries it up over the pick-up, delivering it to the conveyor 4 by which it is carried between the guides 40, 41. The grain is moved beneath the saw-like member 34, the teeth of which penetrate the mass of stalks. This grain, moving beneath the saw-like member, tends to rotate the same and, if the mass of grain is heavy, the saw will be lifted thereby about the pivot 33 as an axis. The drums 21 are positively driven by the shaft 13 at a considerably greater speed than the speed of the saw, the peripheral speed of which is substantially the same as that of the apron. This results in the fingers 26 and 27 engaging the stalks of the grain and pulling them out of the general mass, distributing them over the two lateral portions of the conveyor. However, some of the stalks are not pulled away from the saw but pass along with the conveyor in its mid-portion. Therefore, the stalks are fairly evenly distributed throughout the width of the conveyor from which they pass to the threshing cylinder, evenly distributed throughout its length and thoroughly loosened up, so that no one portion of the cylinder has to do an undue part of the work of threshing the grain, and no choking of the cylinder will result, as sometimes happens with hand-feeding when the feeder fails to sufficiently scatter the grain of the bundles. Also, there is a tendency for the same thing to happen in combine threshing from windrows unless the grain is distributed throughout the length of the cylinder by some means. At the present time, this machine seems to be the only one which is successful in doing this scattering of the windrows before they reach the cylinder.

While the structure of Figs. 1 and 2 works satisfactorily for some grains, there are others which require a machine of the character indicated in Figs. 3 to 9. An illustration of this class of grain is flax.

In the present specification and claims, the term "grain" has been used in a generic sense to designate all seed-bearing stalks which can be threshed by a combine, such, for example, as oats, wheat, rye, millet, clover, flax, etc. However, the greatest utility of this machine will probably be found in the handling of flax and buckwheat, both of which produce a rather heavy crop, somewhat tangled as it grows, and having rather tough stalks. These conditions tend to very materially increase the work of the threshing cylinder unless the windrow is scattered over the surface of the feeding conveyor.

It will of course be understood that the specific description of structure set forth above may be departed from without departing from the spirit of this invention as set forth in this specification and the appended claims.

Having now described my invention, I claim:

1. In a machine for gathering and threshing grain, comprising a threshing mechanism, a pick-up mechanism, and a conveyor for conveying grain from the pick-up to the threshing mechanism; the combination of a rotary dividing means located above the conveyor closely adjacent thereto, and approximately midway of the width thereof, and rotary feeding means rotating in a direction diagonal to the direction of travel of the conveyor to pull the grain laterally and feed it forwardly in its course of travel toward the threshing mechanism.

2. In a grain handling machine having a pick-up, a conveyor, and threshing mechanism; a pair of grain guides mounted adjacent the ends of the pick-up and above the conveyor, closely adjacent thereto, said grain guides extending inwardly and rearwardly in the direction of travel of the grain on the conveyor, a pair of rotary members having their axes arranged at an angle to each other mounted rearwardly of the guides and having fingers projectable from and withdrawable through the surface of said members to engage grain on said conveyor and separate it into a plurality of parts, and driving means for positively rotating said rotary means.

3. In a grain treating machine having a threshing mechanism, a conveyor belt for feeding grain to the threshing mechanism, a pick-up for gathering grain from the ground and delivering it to the belt; the combination of separating mechanism above the grain for tearing it apart as it is fed from a windrow to the separating mechanism and spreading it laterally over the width of the belt so that it will be delivered to the threshing cylinder in a layer of substantially even thickness, the separating mechanism comprising a rotary holding means arranged centrally of the belt to engage the grain and insure that it will not all go to one side of the machine, and a pair of separating drums provided with retractile grain-engaging fingers, said drums being located laterally of the rotary holding means and with their axes nearer to the threshing cylinder than is the axis of the holding means.

4. In a grain treating machine comprising, a threshing mechanism, a conveyor belt to feed grain to the threshing mechanism, and a pick-up to deliver grain to the belt; the combination of a rotary grain-holding member of uneven periphery above the belt in a position to engage grain on the belt and insure separation thereof so that it may be spread out on the belt, and rotary drums upon opposite sides of the grain-holding member having their axes of rotation arranged at an acute angle with relation to the axis of the holding member, said drums being provided with retractile fingers and rotating in directions to pull the grain away from the holding member and spread it out upon the belt.

5. In a grain-handling machine having a pick-up to pick up a windrow of grain and a conveyor to receive grain from said pick-up and convey it to a threshing cylinder; the combination of straw-spreading mechanism located above the conveyor to tear apart and spread the windrow over the exposed surface of the conveyor to be fed evenly to the threshing cylinder, and lateral deflectors extending inwardly toward the center of and above the conveyor to guide the grain on the conveyor to the spreader.

6. In a mechanism for handling grain, a conveyor to convey grain to a threshing cylinder to be threshed, a material holding disc above and in proximity to said conveyor, said disc being provided with saw-like teeth to engage the grain being carried by the conveyor, and mechanism laterally of the disc for pulling grain away from the disc and spreading it out laterally upon the conveyor.

7. A structure as defined by claim 6 provided with driving means for positively rotating the disc.

8. In a grain-handling mechanism having a threshing cylinder, a conveyor to convey grain to said cylinder to be threshed, a saw-like disc mounted above and in proximity to said conveyor to engage and take hold of grain being carried by the conveyor, and means for positively rotating the disc at a peripheral speed approximately equal to the longitudinal speed of the conveyor, whereby to loosen up the grain on the conveyor.

9. In a machine of the character described having a threshing cylinder, a pick-up, and a conveyor to carry unthreshed grain from the pick-up to the cylinder to be threshed; the combination of a saw-toothed disc mounted rotatably above and in proximity to the conveyor, and short drums mounted above the conveyor and laterally of the disc, said drums being arranged diagonally of the disc and rotating in planes making a substantial angle thereto, said drums provided with fingers to engage grain held by said disc and throw it laterally toward the sides of the conveyor.

10. A structure as defined by claim 9 in which the fingers are mounted eccentrically within the drums to be caused to alternately project from and be withdrawn through the peripheries of the drums as the drums rotate about their axes.

11. In a grain-handling machine, a conveyor to carry grain to a point of treatment, means for delivering grain to said conveyor as picked up from a windrow, and a saw-toothed disc rotatably mounted above the conveyor and carried by a pivotally mounted arm so that the disc may rise and fall between definite limits, in accordance with the mass of the grain on the conveyor.

12. A structure as defined by claim 11 in which the forward edges of the saw teeth make considerable angles with radii of the disc extending to the points of the teeth and the following edges of the teeth extend substantially radially of the disc.

13. In a grain processing machine comprising a threshing mechanism, a conveyor belt for feeding grain to the threshing mechanism, a pick-up for gathering grain from the ground and delivering it to the belt; the combination of separating mechanism above the belt for spreading the grain over the width of the belt so that it will be delivered to the threshing cylinder in a layer of substantially even thickness, said separating mechanism comprising centrally arranged holding means to position and hold a windrow in desired position on a belt, and rotary separating means, the mid-plane of which makes an acute angle with a plane perpendicular to the belt and extending in the direction of motion of the belt.

14. A combine feeder comprising a feeding apron, in combination with three rotatable units set at an angle to each other and rotating close to the apron at a speed to cause tearing apart of the grain being carried by the apron, one of the units making acute angles with the other two and extending between them.

GEORGE INNES.